(12) United States Patent
Iwamoto

(10) Patent No.: US 8,135,867 B2
(45) Date of Patent: *Mar. 13, 2012

(54) SECURE OPERATION OF PROCESSORS

(75) Inventor: Tatsuya Iwamoto, Foster City, CA (US)

(73) Assignee: Sony Computer Entertainment, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/787,344

(22) Filed: May 25, 2010

(65) Prior Publication Data

US 2010/0235651 A1 Sep. 16, 2010

Related U.S. Application Data

(63) Continuation of application No. 11/257,761, filed on Oct. 24, 2005, now Pat. No. 7,734,827, which is a continuation-in-part of application No. 11/238,086, filed on Sep. 27, 2005.

(51) Int. Cl.
*G06F 15/173* (2006.01)

(52) U.S. Cl. .................................... 709/248

(58) Field of Classification Search .............. 713/150; 709/223, 217, 248; 712/1, 10, 23, 28, 32
See application file for complete search history.

(56) References Cited

U.S. PATENT DOCUMENTS

| | | | |
|---|---|---|---|
| 3,496,551 A | 2/1970 | Driscoll et al. | |
| 3,596,257 A | 7/1971 | Patel | |
| 5,047,923 A | 9/1991 | Elstner et al. | |
| 5,136,712 A | 8/1992 | Perazzoli et al. | |
| 5,185,694 A | 2/1993 | Edenfield et al. | |
| 5,452,452 A | 9/1995 | Gaetner et al. | |
| 5,504,901 A | 4/1996 | Peterson | |
| 5,528,513 A | 6/1996 | Vaitzblit et al. | |
| 5,592,671 A | 1/1997 | Hirayama | |
| 5,745,778 A | 4/1998 | Alferi | |
| 5,794,017 A | 8/1998 | Evans et al. | |
| 5,826,081 A | 10/1998 | Zolnowsky | |
| 5,832,262 A | 11/1998 | Johnson et al. | |
| 6,003,112 A | 12/1999 | Tetrick | |
| 6,144,986 A | 11/2000 | Silver | |
| 6,279,040 B1 | 8/2001 | Ma et al. | |
| 6,289,369 B1 | 9/2001 | Sundaresan | |
| 6,295,598 B1 | 9/2001 | Bertoni et al. | |
| 6,341,324 B1 | 1/2002 | Caulk et al. | |
| 6,370,681 B1 | 4/2002 | Dellarocas et al. | |
| 6,378,072 B1 | 4/2002 | Collins et al. | |

(Continued)

FOREIGN PATENT DOCUMENTS

EP 0806730 11/1997

(Continued)

OTHER PUBLICATIONS

Office Action dated Sep. 29, 2010 issued for U.S. Appl. No. 11/461,390.

(Continued)

*Primary Examiner* — David Eng
(74) *Attorney, Agent, or Firm* — Joshua D. Isenberg; JDI Patent

(57) ABSTRACT

Secure operation of processors is disclosed. A cell processor receives a secure file image from a client device at a processor of a host device (host cell processor), wherein the secure file image includes encrypted contents.

22 Claims, 4 Drawing Sheets

U.S. PATENT DOCUMENTS

| | | | |
|---|---|---|---|
| 6,463,457 B1 | 10/2002 | Armentrout et al. | |
| 6,526,491 B2 | 2/2003 | Suzuoki et al. | |
| 6,665,699 B1 | 12/2003 | Hunter et al. | |
| 6,665,783 B2 | 12/2003 | Zahir | |
| 6,728,959 B1 | 4/2004 | Merkey | |
| 6,785,756 B2 | 8/2004 | Candea et al. | |
| 6,792,461 B1 | 9/2004 | Hericourt | |
| 7,024,671 B2 | 4/2006 | Yamashita | |
| 7,039,736 B2 | 5/2006 | Mantey et al. | |
| 7,058,750 B1 | 6/2006 | Rankin et al. | |
| 7,127,477 B2 | 10/2006 | Duncombe et al. | |
| 7,236,738 B2 | 6/2007 | Settle | |
| 7,236,998 B2 | 6/2007 | Nutter et al. | |
| 7,298,377 B2 | 11/2007 | Fossum et al. | |
| 7,304,646 B2 | 12/2007 | Iwata | |
| 7,321,958 B2 | 1/2008 | Hofstee et al. | |
| 7,478,390 B2 | 1/2009 | Brokenshire et al. | |
| 7,506,123 B1 | 3/2009 | Labour et al. | |
| 7,512,745 B2 * | 3/2009 | Gschwind et al. | 711/147 |
| 7,516,456 B2 | 4/2009 | Aguilar et al. | |
| 7,522,168 B2 | 4/2009 | Stenson et al. | |
| 7,565,651 B1 | 7/2009 | Carey | |
| 7,734,827 B2 | 6/2010 | Iwamoto | |
| 7,760,206 B2 | 7/2010 | Stenson et al. | |
| 7,797,496 B2 | 9/2010 | Gruber et al. | |
| 2002/0138637 A1 | 9/2002 | Suzuoki et al. | |
| 2002/0169907 A1 | 11/2002 | Candea et al. | |
| 2003/0195920 A1 | 10/2003 | Brenner et al. | |
| 2004/0054883 A1 | 3/2004 | Goodman et al. | |
| 2004/0208178 A1 | 10/2004 | Tuck et al. | |
| 2005/0081203 A1 | 4/2005 | Aguilar et al. | |
| 2005/0091473 A1 | 4/2005 | Aguilar et al. | |
| 2005/0188372 A1 | 8/2005 | Inoue et al. | |
| 2005/0188373 A1 | 8/2005 | Inoue et al. | |
| 2006/0190942 A1 | 8/2006 | Inoue et al. | |
| 2007/0074206 A1 | 3/2007 | Iwamoto | |
| 2007/0074207 A1 | 3/2007 | Bates et al. | |
| 2007/0074212 A1 | 3/2007 | Bates et al. | |
| 2007/0083755 A1 | 4/2007 | Iwamoto | |
| 2007/0198628 A1 | 8/2007 | Bates et al. | |
| 2009/0147013 A1 | 6/2009 | Stenson et al. | |
| 2009/0150634 A1 | 6/2009 | Labour et al. | |

FOREIGN PATENT DOCUMENTS

| | | |
|---|---|---|
| GB | 2394336 | 4/2004 |
| JP | 01-258135 | 10/1989 |
| JP | 10-55284 | 2/1998 |
| JP | 2001005679 | 1/2001 |
| JP | 2002007364 | 1/2002 |
| JP | 2004246702 | 9/2004 |
| JP | 2004320174 | 11/2004 |
| JP | 2005513587 | 5/2005 |
| JP | 2005235228 | 9/2005 |
| JP | 2005235229 | 9/2005 |
| WO | 9706484 | 2/1997 |
| WO | 0203208 | 1/2002 |
| WO | 02091180 | 11/2002 |
| WO | 2004015553 | 2/2004 |
| WO | 2004084069 | 9/2004 |

OTHER PUBLICATIONS

Final Office Action dated Nov. 8, 2010 issued for U.S. Appl. No. 11/238,086.
Office Action dated Nov. 15, 2010 issued for U.S. Appl. No. 12/796,601.
Final Office Action dated Aug. 5, 2010 issued for U.S. Appl. No. 11/238,077.
Office Action dated Aug. 16, 2010 for Japanese patent application No. 2006-262024 and its English translation.
Office Action dated Aug. 16, 2010 for Japanese patent application No. 2006-262023 and its English translation.
Advisory Action dated Oct. 15, 2010 issued for U.S. Appl. No. 11/238,077.
Office Action dated Jun. 4, 2010 issued for U.S. Appl. No. 12/372,665.
Final Office Action dated Sep. 29, 2010 issued for U.S. Appl. No. 12/372,665.
Advisory Action dated Dec. 9, 2010 issued for U.S. Appl. No. 12/372,665.
Final Office Action dated Dec. 17, 2010 issued for U.S. Appl. No. 12/372,665.
Final Office Action dated Aug. 16, 2010 issued for U.S. Appl. No. 111/238,087.
Advisory Action dated Oct. 25, 2010 issued for U.S. Appl. No. 111/238,087.
Notification of Reason(s) for Refusal dated Nov. 30, 2010 issued for Japanese Patent Application No. 2008-533492.
Notification of Reason(s) for Refusal dated Nov. 30, 2010 issued for Japanese Patent Application No. 2008-533495.
Final Office Action dated Feb. 5, 2010 issued for U.S. Appl. No. 11/238,086.
Office Action dated Nov. 4, 2008 issued for U.S. Appl. No. 11/238,086.
DS Milojicic et al., "Process Migration" ACM Computing Surveys, ACM, New Work, NY, US, vol. 32, No. 3, Sep. 2000, pp. 241-299, XP002254767 ISSN: 0360-0300.
K Chanchio et al. "Data Collection and Restoration for the Heterogeneous Process Migration" Software Practice and Experience, Wiley & Sons, Bognor Regis, GB, vol. 32, No. 9, Jul. 25, 2002, pp. 845-871, XP001115308 ISSN: 0038-0644.
European Search Report for European Application No. 0625491 dated Dec. 21, 2007.
Sony Computer Entertainment Incorporated, "Cell Broadband Engine Architecture", Version 1.0, Aug. 8, 2005.
Pratit Santiprabhob et al. "Fuzzy Rule-Based Process Scheduling Method for Critical Distributed Computing Environment"—Proceedings 2003 IEEE, Mar. 8, 2003, vol. 5, pp. 52267-52276.
J.A. Kahle et al. "Introduction to the Cell Multiprocessor" IBM Journal of Research and Development, vol. 49, No. 4-5, Jul. 2005, pp. 589-604.
George M. Candea et al. "Vassal: Loadable Scheduler Support for Multi-Policy Scheduling" Proceedings of the Usenix Window NT Symposium, Aug. 1998, pp. 157-166.
Alexandre E. Eichenberger et al., "Optimizing Compiler for a Cell Processor", Proceedings of 14th International Conference on Parallel Architectures and Compilation Techniques, 2005 (PACT '05), pp. 161-172.
B. Flachs et al., "A Streaming Processing Unit for a Cell Processor", 2005 IEEE International Solid-State Circuits Conference-Digest of Technical Papers, pp. 134-135.
Scott Whitman, "Dynamic Load Balancing for Parallel Polygon Rendering", IEEE Computer Graphics and Applications, vol. 14, No. 4, Jul. 1994, pp. 41-48.
Jaspal Subhlok et al., "Communication and Memory Requirements as the Basis for Mapping Task and Data Parallel Programs", Supercomputing '94, Proceedings Washington, DC, 1994 IEEE, pp. 330-339.
Alan Heirich, "Optimal Automatic Multi-Pass Shader Partioning by Dynamic Programming", Graphics Hardware (2005), pp. 91-98.
International Application No. PCT/US2006/037345, "The International Search Report" and "The Written Opinion of the International Searching Authority".
International Application No. PCT/US2006/037334, "The International Search Report" and "The Written Opinion of the International Searching Authority".
International Application No. PCT/US2006/037336, "The International Search Report" and "The Written Opinion of the International Searching Authority".
International Application No. PCT/US2006/037338, "The International Search Report" and "The Written Opinion of the International Searching Authority".
Non-Final Office Action for U.S. Appl. No. 11/238,086 dated Aug. 11, 2009.
Final Office Action dated Apr. 20, 2009 for U.S. Appl. No. 11/238,086 dated Aug. 11, 2009.
U.S. Appl. No. 11/238,086, entitled "Operating Cell Processors Over a Network", to Tatsuya Iwamoto, Filed Sep. 27, 2005.

Notice of Allowance and Fee(s) Due dated Jan. 26, 2010 issued for U.S. Appl. No. 11/257,761.
Office Action dated Aug. 27, 2009 issued for U.S. Appl. No. 11/257,761.
Final Office Action dated May 7, 2009 issued for U.S. Appl. No. 11/257,761.
Office Action dated Nov. 24, 2008 issued for U.S. Appl. No. 11/257,761.
William et al., "The Potential of the Cell Processor for Scientific Computing", Conference on Computing Frontiers, ACM, 2006, pp. 9-20.
Gschwind, "Chip Multiprocessing and the Cell Broadband Engine", ACM, 2006, pp. 1-8.
Office Action dated Jan. 10, 2008 for U.S. Appl. No. 11/238,095.
Final Office Action dated Jul. 29, 2008 for U.S. Appl. No. 11/238,095.
Final Office Action dated Aug. 24, 2011 issued for U.S. Appl. No. 11/238,086.
Office Action dated Apr. 8, 2011 issued for U.S. Appl. No. 11/238,086.
Advisory Action dated Jan. 20, 2011 issued for U.S. Appl. No. 11/238,086.
Saxena N R et al: "Control-flow checking using watchdog assists and extended-precision checksums", International Symposium on Fault Tolerant Computing. (FTCS). Chicago, Jun. 20-23, 1989; [International Symposium on Fault Tolerant Computing Systems. (FTCS)], Washington, IEEE Comp. Soc. Press, US, vol. Symp. 19, Jun. 21, 1989, pp. 428-435, XP010016731, DOI: D0I:10.1109/FTCS.1989. 105615 ISBN: 978-0-8186-1959-5.
European Patent Application w/European Search Report, EP2284702 A1, Feb. 16, 2011, "Operating Cell Processors Over a Network", Tatsuya Iwamoto, Foster City CA 94404-2175 (US), 22 pages https://data.epo.org/publication-server/getpdf.jsp?pn=2284702&ki=A1&cc=EP.

Notification of Reason(s) for Refusal dated Jan. 11, 2011 issued for Japanese Patent Application No. 2006-262023.
Notification of Reason(s) for Refusal dated Jan. 11, 2011 issued for Japanese Patent Application No. 2006-262024.
Office Action dated May 27, 2010 for Chinese patent application No. 200610142304.7 and its English translation.
Office Action dated May 6, 2010 for Chinese patent application No. 200610142305.1 and its English translation.
Office Action dated Mar. 12, 2010 issued for U.S. Appl. No. 11/238,077.
U.S. Appl. No. 60/650,153, filed Feb. 4, 2005.
Office Action dated Oct. 16, 2009 issued for U.S. Appl. No. 11/371,424.
Notice of Allowance and Fee Due(s) dated Mar. 8, 2010 issued for U.S. Appl. No. 12/371,424.
Office Action dated Aug. 30, 2007 issued for U.S. Appl. No. 11/238,085.
Notice of Aiiowance and Fee(s) Due dated Nov. 25, 2008 issued for U.S. Appl. No. 11/238,095.
Office Action dated Feb. 20, 2008 issued for U.S. Appl. No. 11/238,085.
Final Office Action dated Aug. 5, 2008 issued for U.S. Appl. No. 11/238,085.
Office Action dated Jun. 22, 2010 issued for U.S. Appl. No. 11/238,086.
Notice of Allowance and Fee Due(s) dated Nov. 3, 2008 issued for U.S. Appl. No. 11/238,085.
Office Action dated May 13, 2008 issued for U.S. Appl. No. 11/238,086.
Office Action dated Apr. 14, 2010 issued for U.S. Appl. No. 11/238,087.

* cited by examiner

SECURE OPERATION OF PROCESSORS

CLAIM OF PRIORITY BENEFIT

This application is claims the priority benefit of commonly-assigned co-pending U.S. patent application Ser. No. 11/238,086, filed Sep. 27, 2005 and entitled "OPERATING CELL PROCESSORS OVER A NETWORK", which is pending and published as Patent Application Publication Number 20070074206, the entire disclosures of which are incorporated herein by reference.

CROSS-REFERENCE TO RELATED APPLICATIONS

This application is a continuation and claims the priority benefit of commonly-assigned co-pending U.S. patent application Ser. No. 11/257,761, filed Oct. 24, 2005, entitled "OPERATION OF CELL PROCESSORS", which is pending and published as Patent Application Publication Number 20070083755, the entire disclosures of which are incorporated herein by reference.

This application is related to commonly-assigned U.S. patent application Ser. No. 11/238,077, filed Sep. 27, 2005 and entitled "CELL PROCESSOR METHODS AND APPARATUS" to John P. Bates, Payton R. White and Attila Vass, the entire disclosures of which are incorporated herein by reference.

This application is also related to commonly-assigned U.S. patent application Ser. No. 11/238,095, filed Sep. 27, 2005 and which is issued on Apr. 21, 2009 with the U.S. Pat. No. 7,522,168, entitled "CELL PROCESSOR TASK AND DATA MANAGEMENT" to Richard B. Stenson and John P. Bates, the entire disclosures of which are incorporated herein by reference.

This application is related to commonly-assigned co-pending U.S. patent application Ser. No. 11/238,087, filed Sep. 27, 2005 and entitled "SPU TASK MANAGER FOR CELL PROCESSOR" to John P. Bates, Payton R. White, Richard B. Stenson, Howard Berkey, Attila Vass and Mark Cerny, which is pending and published as Patent Application Publication Number 20070074207, the entire disclosures of which are incorporated herein by reference.

This application is also related to commonly-assigned U.S. patent application Ser. No. 11/238,085, filed Sep. 27, 2005 and which is issued on Mar. 17, 2009 with the U.S. Pat. No. 7,506,123, entitled "METHOD AND SYSTEM FOR PERFORMING MEMORY COPY FUNCTION ON A CELL PROCESSOR" to Antoine Labour John P. Bates and Richard B. Stenson, the entire disclosures of which are incorporated herein by reference.

FIELD OF THE INVENTION

Embodiments of the present invention are directed cell processors and more particularly to securely operating multiple cell processors over a network.

BACKGROUND OF THE INVENTION

Cell processors are a type of microprocessor that utilizes parallel processing. The basic configuration of a cell processor includes a "Power Processor Element" ("PPE") (sometimes called "Processing Element", or "PE"), and multiple "Synergistic Processing Elements" ("SPE"). The PPEs and SPEs are linked together by an internal high speed bus dubbed "Element Interconnect Bus" ("EIB"). Cell processors are designed to be scalable for use in applications ranging from the hand held devices to main frame computers.

In certain cell processors, the SPEs provide a monolithic execution environment. Each SPE has a well isolated execution set or context that facilitates portability and network transparency of applications running on the cell processor. Such portable SPE applications have been called SPUlets or APUlets. However, there are disadvantages associated with the identical execution environment sizes for the SPUlets. Specifically, SPUlets only come in a single grain size. A normal prior art SPUlet can simply be a single executable file image that is to be loaded into a single SPE. As applications expect more resources for execution, splitting these resources into multiple SPUlets is not efficient, particularly when such SPUlets need to be transferred across a network while maintaining security.

Thus, there is a need in the art, for a data structure having a larger sized unit of migration so that cell processor applications can be packaged and migrated to operate and interoperate securely across and in a network.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

In embodiments of the present invention, a cell processor can load, store and save information relating to the operation of one or more SPE of the cell processor in units of migration referred to herein as extended SPUlets. Unlike prior art SPUlets, an extended SPUlet according to embodiments of the present invention may include either two or more SPU images or one or more SPU images and additional information related to operation of multiple SPU, e.g., shared initialized data. Generally, the shared data is shared by two or more SPE that execute the extended SPUlet. To isolate the execution context, it is desirable to avoid PPU access to the shared data. However, the PPU may do so for the purpose of management, such as suspend and resume. Communication between the extended SPUlet and managing PPU can be done through a message box area of memory specifically set up for that purpose. The extended SPUlet provides a larger grain size than prior art SPUlets. The extended SPUlet can address issues of setting up multiple SPEs, providing additional memory for shared initialized data, additional code, etc., and memory mapping between the SPEs and system main memory.

A cell processor may generally include four separate types of functional components: a PowerPC Processor Element (PPE), a Synergistic Processor Unit (SPU), a Memory Flow Controller (MFC) and an Internal Interrupt Controller (IIC). The computational units in the CBEA-compliant processor are the PPE and the SPU. Each SPU must have a dedicated local storage, a dedicated MFC with its associated Memory Management Unit MMU), and Replacement Management Table (RMT). The combination of these components is referred to as an SPU Element, (SPE). A cell processor may be a single chip, a multi-chip module (or modules), or multiple single-chip modules on a motherboard or other second-level package, depending on the technology used and the cost/performance characteristics of the intended design point.

Figure 1:
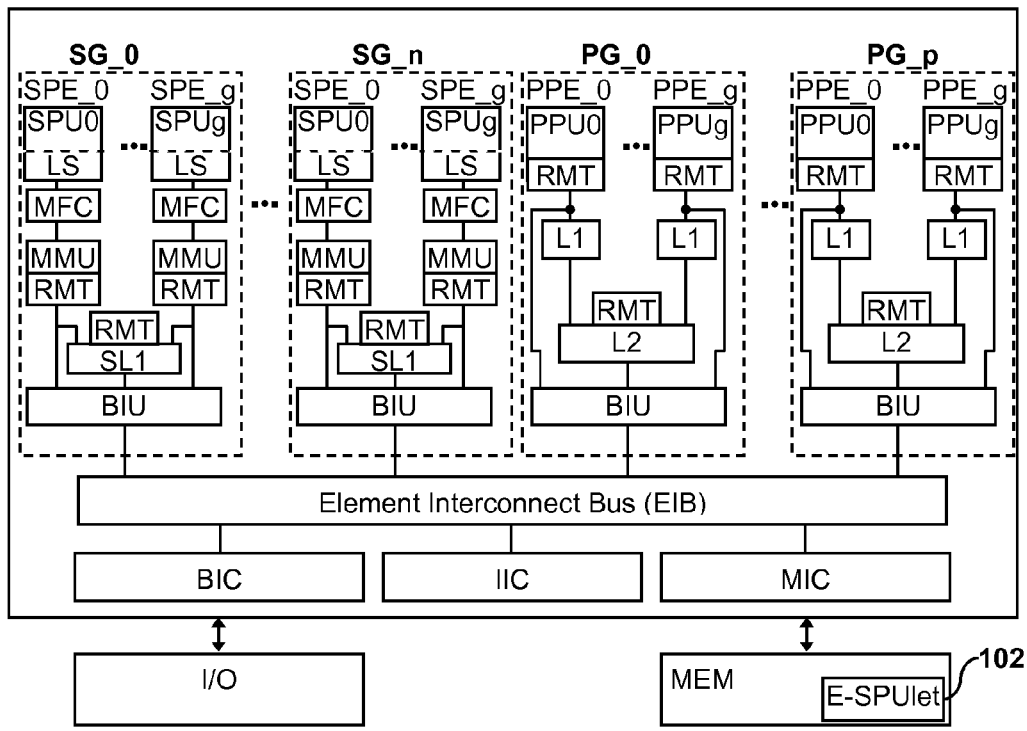
FIG. 1 is a schematic diagram of a cell broadband engine architecture implementing an secure SPUlet according to an embodiment of the present invention.

By way of example, and without limitation, FIG. 1 illustrates a type of cell processor 100 characterized by an architecture known as Cell Broadband engine architecture (CBEA)-compliant processor. A cell processor can include multiple groups of PPEs (PPE groups) and multiple groups of SPEs (SPE groups) as shown in this example. Alternatively, the cell processor may have only a single SPE group and a single PPE group with a single SPE and a single PPE. Hardware resources can be shared between units within a group. However, the SPEs and PPEs must appear to software as independent elements.

In the example depicted in FIG. 1, the cell processor 100 includes a number of groups of SPEs SG-0 . . . SG_n and a number of groups of PPEs PG_0 . . . PG_p. Each SPE group includes a number of SPEs SPE0 . . . SPEg. The cell processor 100 also includes a main memory MEM and an input/output function I/O. One or more extended SPUlets 102 of the types described herein may be stored in the main memory MEM.

Each PPE group includes a number of PPEs PPE_0 . . . PPE_g SPE. In this example a group of SPEs shares a single cache SL1. The cache SL1 is a first-level cache for direct memory access (DMA) transfers between local storage and main storage. Each PPE in a group has its own first level (internal) cache L1. In addition the PPEs in a group share a single second-level (external) cache L2. While caches are shown for the SPE and PPE in FIG. 1, they are optional for cell processors in general and CBEA in particular.

An Element Interconnect Bus EIB connects the various components listed above. The SPEs of each SPE group and the PPEs of each PPE group can access the EIB through bus interface units BIU. The cell processor 100 also includes two controllers typically found in a processor: a Memory Interface Controller MIC that controls the flow of data between the EIB and the main memory MEM, and a Bus Interface Controller BIC, which controls the flow of data between the I/O and the EIB. Although the requirements for the MIC, BIC, BIUs and EIB may vary widely for different implementations, those of skill in the art will be familiar their functions and circuits for implementing them.

Each SPE is made includes an SPU (SPU0 . . . SPUg). Each SPU in an SPE group has its own local storage area LS and a dedicated memory flow controller MFC that includes an associated memory management unit MMU that can hold and process memory-protection and access-permission information.

The PPEs may be 64-bit PowerPC Processor Units (PPUs) with associated caches. A CBEA-compliant system includes a vector multimedia extension unit in the PPE. The PPEs are general-purpose processing units, which can access system management resources (such as the memory-protection tables, for example). Hardware resources defined in the CBEA are mapped explicitly to the real address space as seen by the PPEs. Therefore, any PPE can address any of these resources directly by using an appropriate effective address value. A primary function of the PPEs is the management and allocation of tasks for the SPEs in a system.

The SPUs are less complex computational units than PPEs, in that they do not perform any system management functions. They generally have a single instruction, multiple data (SIMD) capability and typically process data and initiate any required data transfers (subject to access properties set up by a PPE) in order to perform their allocated tasks. The purpose of the SPU is to enable applications that require a higher computational unit density and can effectively use the provided instruction set. A significant number of SPUs in a system, managed by the PPEs, allow for cost-effective processing over a wide range of applications. The SPUs implement a new instruction set architecture.

MFC components are essentially the data transfer engines. The MFC provides the primary method for data transfer, protection, and synchronization between main storage of the cell processor and the local storage of an SPE. An MFC command describes the transfer to be performed. A principal architectural objective of the MFC is to perform these data transfer operations in as fast and as fair a manner as possible, thereby maximizing the overall throughput of a cell processor. Commands for transferring data are referred to as MFC DMA commands. These commands are converted into DMA transfers between the local storage domain and main storage domain.

Each MFC can typically support multiple DMA transfers at the same time and can maintain and process multiple MFC commands. In order to accomplish this, the MFC maintains and processes queues of MFC commands The MFC can queue multiple transfer requests and issues them concurrently. Each MFC provides one queue for the associated SPU (MFC SPU command queue) and one queue for other processors and devices (MFC proxy command queue). Logically, a set of MFC queues is always associated with each SPU in a cell processor, but some implementations of the architecture can share a single physical MFC between multiple SPUs, such as an SPU group. In such cases, all the MFC facilities must appear to software as independent for each SPU. Each MFC DMA data transfer command request involves both a local storage address (LSA) and an effective address (EA). The local storage address can directly address only the local storage area of its associated SPU. The effective address has a more general application, in that it can reference main storage, including all the SPU local storage areas, if they are aliased into the real address space (that is, if MFC_SR1[D] is set to '1').

An MFC presents two types of interfaces: one to the SPUs and another to all other processors and devices in a processing group. The SPUs use a channel interface to control the MFC. In this case, code running on an SPU can only access the MFC SPU command queue for that SPU. Other processors and devices control the MFC by using memory-mapped registers. It is possible for any processor and device in the system to control an MFC and to issue MFC proxy command requests on behalf of the SPU. The MFC also supports bandwidth reservation and data synchronization features. To facilitate communication between the SPUs and/or between the SPUs and the PPU, the SPEs and PPEs may include signal notification registers that are tied to signaling events. Typically, the PPEs and SPEs are coupled by a star topology in which the PPE acts as a router to transmit messages to the SPEs. Such a topology does not provide for direct communication between SPEs. Instead each SPE and each PPE has a one-way signal notification register referred to as a mailbox. The mailbox can be used for SPE to host OS synchronization.

The IIC component manages the priority of the interrupts presented to the PPEs. The main purpose of the IIC is to allow interrupts from the other components in the processor to be handled without using the main system interrupt controller. The IIC is really a second level controller. It is intended to handle all interrupts internal to a CBEA-compliant processor or within a multiprocessor system of CBEA-compliant processors. The system interrupt controller will typically handle all interrupts external to the cell processor.

In a cell processor system, software often must first check the IIC to determine if the interrupt was sourced from an external system interrupt controller. The IIC is not intended to replace the main system interrupt controller for handling interrupts from all I/O devices.

There are two types of storage domains within the cell processor: local storage domain and main storage domain. The local storage of the SPEs exists in the local storage domain. All other facilities and memory are in the main storage domain. Local storage consists of one or more separate areas of memory storage, each one associated with a specific SPU. Each SPU can only execute instructions (including data load and data store operations) from within its own associated local storage domain. Therefore, any required data transfers to, or from, storage elsewhere in a system must always be performed by issuing an MFC DMA command to transfer data between the local storage domain (of the individual SPU) and the main storage domain, unless local storage aliasing is enabled.

An SPU program references its local storage domain using a local address. However, privileged software can allow the local storage domain of the SPU to be aliased into main storage domain by setting the D bit of the MFC_SR1 to '1'. Each local storage area is assigned a real address within the main storage domain. (A real address is either the address of a byte in the system memory, or a byte on an I/O device.) This allows privileged software to map a local storage area into the effective address space of an application to allow DMA transfers between the local storage of one SPU and the local storage of another SPU.

Other processors or devices with access to the main storage domain can directly access the local storage area, which has been aliased into the main storage domain using the effective address or I/O bus address that has been mapped through a translation method to the real address space represented by the main storage domain.

Data transfers that use the local storage area aliased in the main storage domain should do so as caching inhibited, since these accesses are not coherent with the SPU local storage accesses (that is, SPU load, store, instruction fetch) in its local storage domain. Aliasing the local storage areas into the real address space of the main storage domain allows any other processors or devices, which have access to the main storage area, direct access to local storage. However, since aliased local storage must be treated as non-cacheable, transferring a large amount of data using the PPE load and store instructions can result in poor performance. Data transfers between the local storage domain and the main storage domain should use the MFC DMA commands to avoid stalls.

The addressing of main storage in the CBEA is compatible with the addressing defined in the PowerPC Architecture. The CBEA builds upon the concepts of the PowerPC Architecture and extends them to addressing of main storage by the MFCs.

An application program executing on an SPU or in any other processor or device uses an effective address to access the main memory. The effective address is computed when the PPE performs a load, store, branch, or cache instruction, and when it fetches the next sequential instruction. An SPU program must provide the effective address as a parameter in an MFC command. The effective address is translated to a real address according to the procedures described in the overview of address translation in PowerPC Architecture, Book III. The real address is the location in main storage which is referenced by the translated effective address. Main storage is shared by all PPEs, MFCs, and I/O devices in a system. All information held in this level of storage is visible to all processors and to all devices in the system. This storage area can either be uniform in structure, or can be part of a hierarchical cache structure. Programs reference this level of storage using an effective address.

The main memory of a system typically includes both general-purpose and nonvolatile storage, as well as special-purpose hardware registers or arrays used for functions such as system configuration, data-transfer synchronization, memory-mapped I/O, and I/O subsystems. There are a number of different possible configurations for the main memory. By way of example and without limitation, Table I lists the sizes of address spaces in main memory for a particular cell processor implementation known as Cell Broadband Engine Architecture (CBEA)

TABLE I

| Address Space | Size | Description |
| --- | --- | --- |
| Real Address Space | $2^m$ bytes | where $m \leq 62$ |
| Effective Address Space | $2^{64}$ bytes | An effective address is translated to a virtual address using the segment lookaside buffer (SLB). |
| Virtual Address Space | $2^n$ bytes | where $65 \leq 80$<br>A virtual address is translated to a real address using the page table. |
| Real Page | $2^{12}$ bytes | |
| Virtual Page | $2^p$ bytes | where $12 \leq p \leq 28$<br>Up to eight page sizes can be supported simultaneously. A small 4-KB (p = 12) page is always supported. The number of large pages and their sizes are implementation-dependent. |
| Segment | $2^{28}$ bytes | The number of virtual segments is $2(n - 28)$ where $65 \leq n \leq 80$ |

Note:
The values of "m," "n," and "p" are implementation-dependent.

The cell processor 100 may include an optional facility for managing critical resources within the processor and system. The resources targeted for management under the cell processor are the translation lookaside buffers (TLBs) and data and instruction caches. Management of these resources is controlled by implementation-dependent tables.

Tables for managing TLBs and caches are referred to as replacement management tables RMT, which may be associated with each MMU. Although these tables are optional, it is often useful to provide a table for each critical resource, which can be a bottleneck in the system. An SPE group may also contain an optional cache hierarchy, the SL1 caches, which represent first level caches for DMA transfers. The SL1 caches may also contain an optional RMT.

The foregoing is intended to provide an introduction and description of the terminology used in cell processor implementations. The foregoing discussion is also intended to set forth a context for data structures and methods according to embodiments of the present invention. Such embodiments are not limited to implementation on or with cell processors having the architecture described above. However, any or all of the embodiments described below may be implemented using such cell architecture as an environment in which extended SPUlets may be encountered and utilized.

Figure 2A:
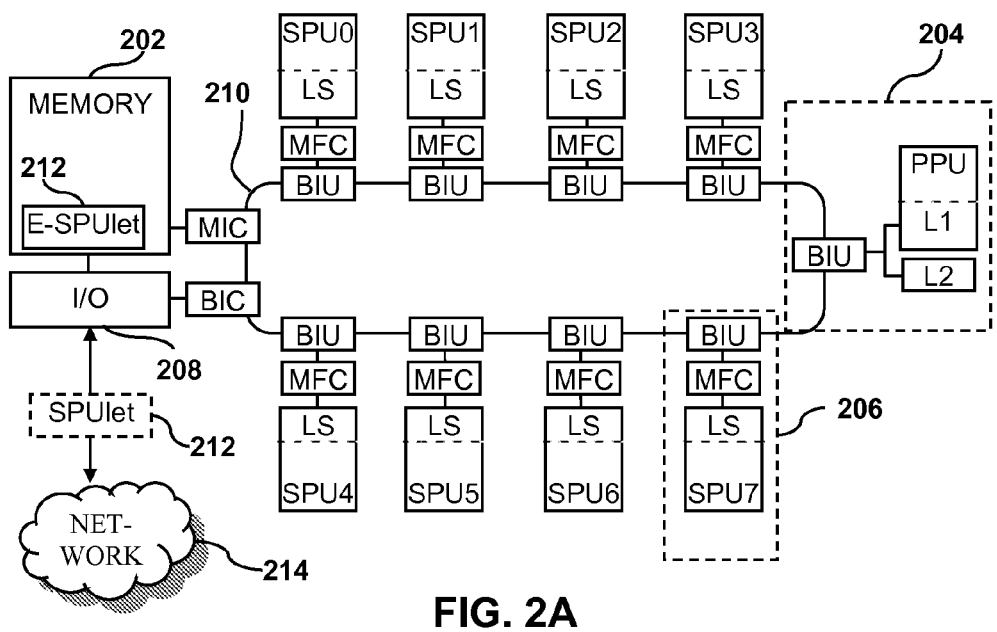
FIG. 2A is a schematic diagram of a cell processor according to an embodiment of the present invention.

FIG. 2 depicts an example of a cell processor 200 operating with extended SPUlets. For the purposes of illustration, the cell processor includes a main memory 202, a single PPE 204 and eight SPEs 206. However, a cell processor may be configured with any number of SPE's. With respect to FIG. 2, the memory, PPE, and SPEs can communicate with each other and with an I/O device 208 over a ring-type element interconnect bus 210. Secure SPUlets 212 may be stored in main memory 202, transferred to other cell processors, e.g., via the I/O device 208 and a network 214, or loaded piecewise into the various SPEs 206 that make up the cell processor.

Figure 2B:
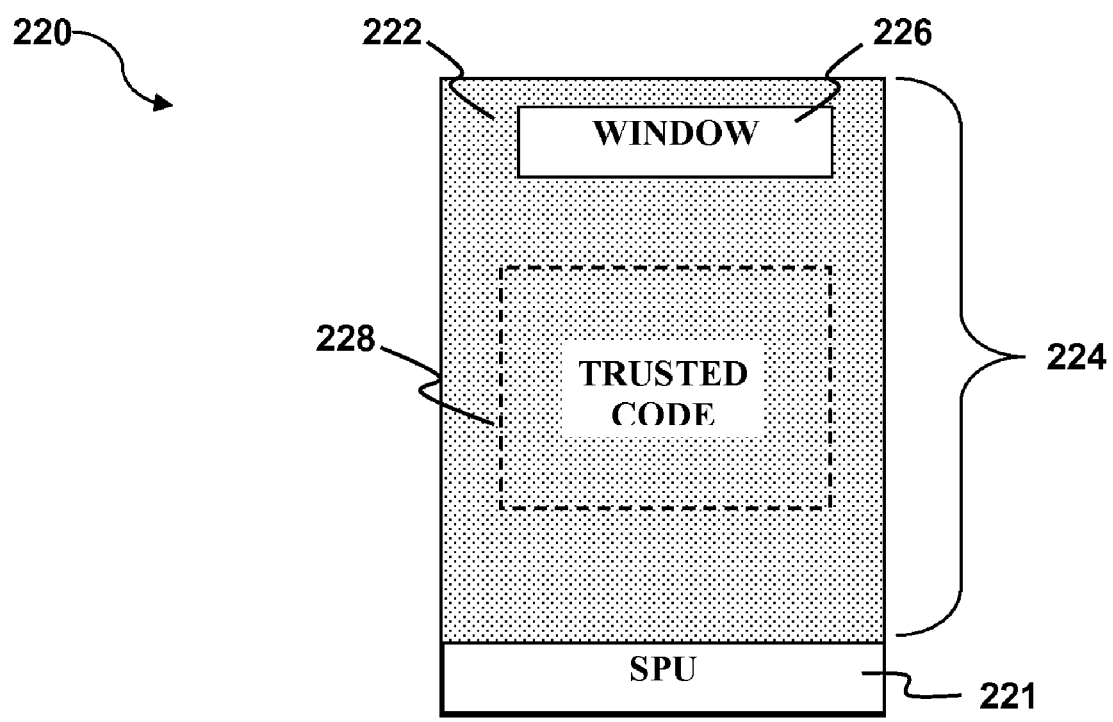
FIG. 2B is a schematic diagram of a secure SPE according to an embodiment of the present invention.

In embodiments of the present invention, at least one of the SPE's 206 is a secure SPE as described below. As shown in FIG. 2B, a secure SPE 220 includes an SPU 221, a local store 224 and some means for invoking a secure mode. Such means may be implemented in hardware, software or some combination of hardware and software. The means for invoking the secure mode passes the address of encrypted code stored, e.g., in external memory, the host processor's main memory 202 or the local store of some other SPE on the host processor. According to embodiments of the present invention, it is possible to secure a single SPE, all the SPEs or any subset of the SPEs on the host processor. In the secure mode a secure portion 222 of a local store 224 of the secure SPE 220 is blocked off from access by other processors (PPE or other SPEs) of the host cell processor 200 with the exception of a window 226 through which the secure SPE can read in and/or write out code and/or data that is suitable for non-secure transmission. Examples of code and/or data that is suitable for non-secure transmission include, e.g., code or data that has already been encrypted.

The secure portion 222 is loaded with trusted code 228. As used herein, the term trusted code refers to code that has been encrypted, authenticated or signed. Embodiments of the present invention are not limited to any particular form of encryption authentication or signature. Any suitable manner of encryption, authentication or signature may be used. Furthermore, trusted code includes code having some combination of two or more of encryption, authentication or signature. By way of example and without limitation, the trusted code 228 may included an encrypter-decripter-loader that can load encrypted code and/or data to the secure area, decrypt the encrypted code/data and re-encrypt data before sending it out through the window 226.

Figure 3:
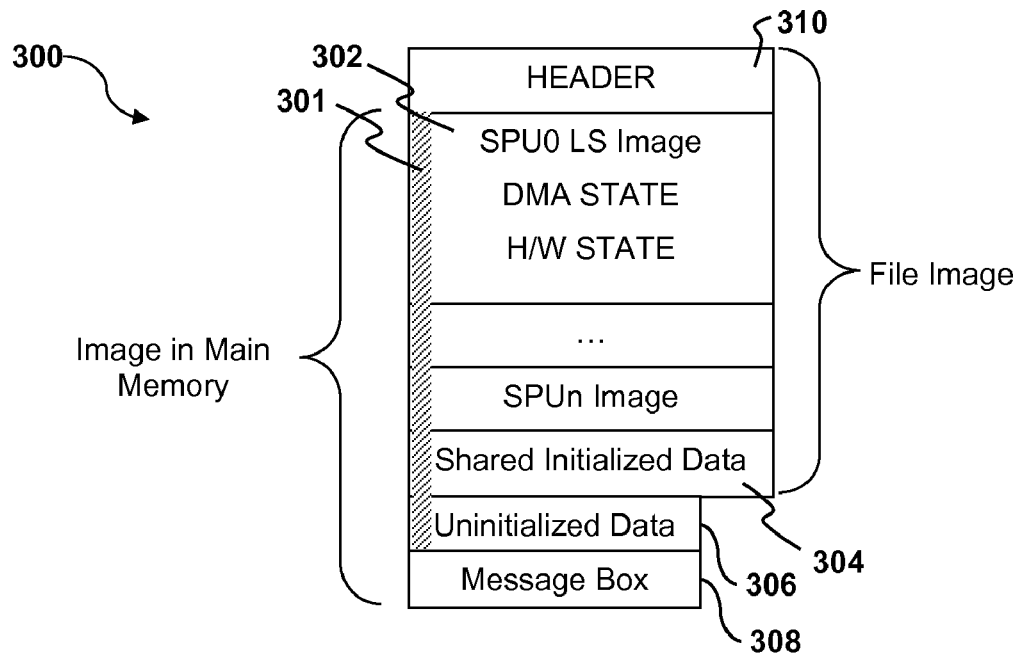
FIG. 3 is a block diagram illustrating an extended SPUlet according to an embodiment of the present invention.

As set forth above, the secure SPUlets 102, 212 generally include one or more SPU images and additional data, such as uninitialized data or they may include two or more SPU images. FIG. 3 illustrates the arrangement of data that can make up a secure SPUlet 300 which includes an encrypted portion 301. The encrypted portion may include but is not limited to one or more encrypted SPU images 302, encrypted share initialized data 304, encrypted information relating to uninitialized data 306. The secure SPUlet 300 may further include a message box 308. The secure SPUlet 300 may optionally include a file header 310, which may or may not include encrypted information.

The encrypted SPU images 302 typically contain the contents of the local store of an SPE in a cell processor in encrypted form. SPU images may be gathered from the SPEs during a process running on a client device or they may be received at the client device for processing at the host cell processor. The encrypted SPU images 302 may contain data that has been processed by an SPU, data to be processed by the SPU, and/or code for processing the data with the SPU. The encrypted SPU images 302 may also contain data regarding a DMA state of the MFC and a hardware state of the SPE when the extended SPUlet 300 was suspended. The encrypted initialized data 304 is data having established values that can be stored in main memory and/or shared amongst several SPE that are executing a particular process, depending on the configuration. In contrast, encrypted uninitialized data has no pre-established value, but parameters regarding that data are known. For example, the information relating to uninitialized data 306 may refer to the type of data, size and location of memory space needed for that data.

Operating on the secure SPUlet 300 requires decryption of its encrypted components. As such, the SPU image may contain SPUlet specific code for decryption of code and/or data before it can be run in the secure area of a secure SPE. In addition, before a secure SPE can write information to main memory or anywhere else, the data is typically re-encrypted before being sent out through the window 226.

It is important to note that the particular contents of a secure SPUlet depend on context. For example, when a secure SPUlet has been saved to main memory, the image of the extended SPUlet 300 in system memory includes the encrypted SPU images 302, encrypted shared initialized data 304, encrypted information regarding uninitialized data 306 and message box 308. This combination of data elements is referred to as the encrypted image of the secure SPUlet in system memory. However, when a secure SPUlet 300 is transferred from a client device to a cell processor (referred to herein as a host processor) a file header 310 may be combined with the encrypted SPU images 302 and encrypted initialized data 304. This combination of data elements (referred to herein as an encrypted file image) is what is transferred.

The file header 310 header may include encrypted information that tells the host cell processor about the secure SPUlet. Such information may include an encryption format identifier, encryption version number, or other information identifying the type of decryption needed to decrypt the secure SPUlet 300. The header information may be categorized as either Execution Information or Extended SPUlet Information. Execution Information may include Host resources, connection requirements, and other criteria describing the environment in which the SPUlet should run.

Extended SPUlet information describes things like memory layout, mapping, start offsets and other initialization, message box configuration.

Such information may include, e.g., memory availability (i.e., how much memory is needed to run the extended SPUlet), SPU availability (i.e., how many SPU are needed to run the extended SPUlet), network latency and bandwidth and system frequency requirements for the extended SPUlet, control flow information (e.g., whether the host or client machine has the right to interrupt and suspend the extended SPUlet), memory offsets, breakpoints of one or more SPU images, size of one or more SPU images, memory mapping information, message box layout, message box capabilities and the like. It should be understood that the header may also define information in connection with a user, id, system, function, data type, channel, flag, key, password, protocol, target or profile or any metric in which system or operation may be established wherein such may relate to or be directed from the extended SPUlet and including but not limited to configuration, initialization, modification or synchronization of operations involving any program or system or module or object that satisfies an overall goal of the application in which the extended SPUlet operates to serve. Such applications may include security related applications and protocols, encoding, decoding and transcoding applications, transactions, etc. The file header 310 can be created by the client device just prior to transmission and transmitted with the SPU images and initialized data. Alternatively, the file header 310 may be part of the file image and sent as part of a stack transmission.

Figure 4:
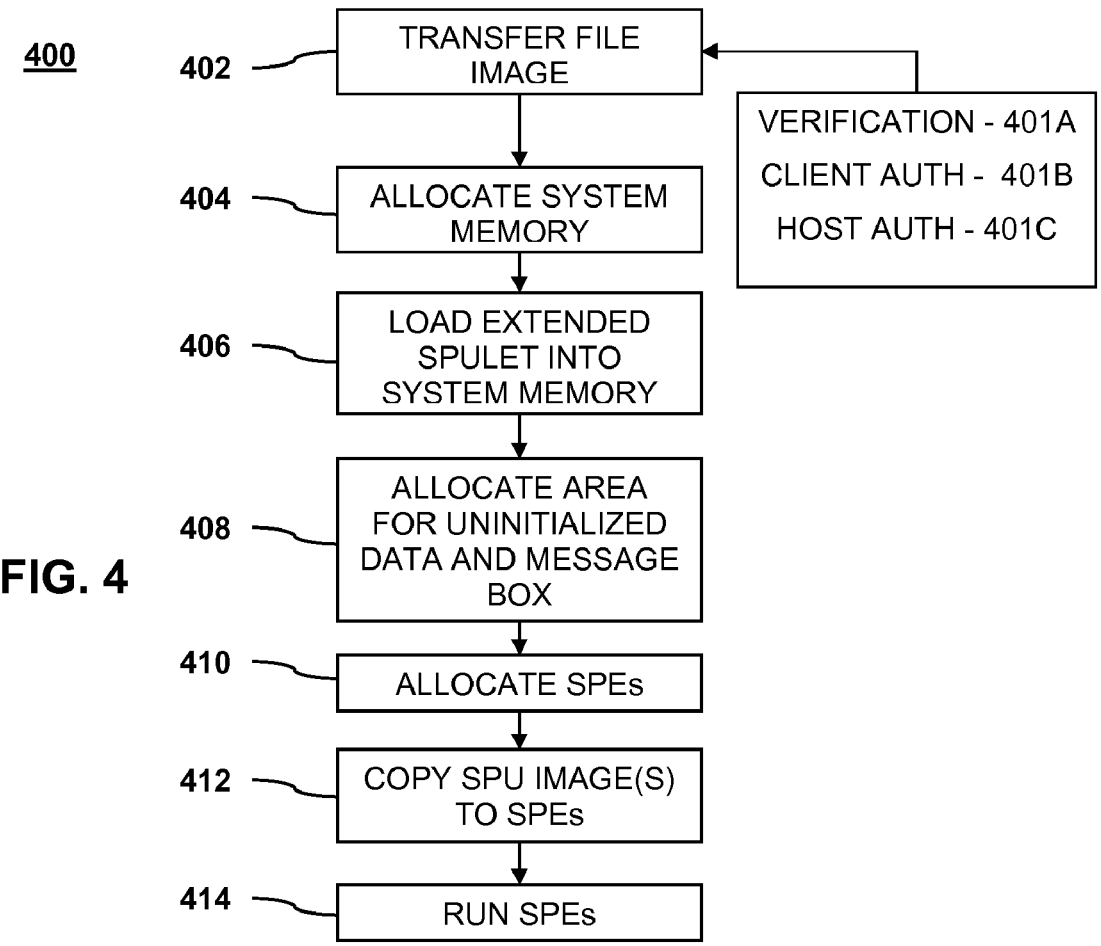
FIG. 4 is a flow diagram illustrating execution of an extended SPUlet according to an embodiment of the present invention.

In general, an SPU cannot access privileged SPU control. Consequently it is often necessary for the SPUlet 300 to load each SPE with suitable code, which can be started when loaded. Furthermore, in order to communicate, the SPUlet 300 desirably includes memory mapping information that maps the SPEs involved to each other and to any shared portion of main memory. FIG. 4 illustrates a general method 400 for securely operating a cell processor using secure SPUlets.

Before the host device 200 can load the SPUlet 300 the host processor preferably uses an authenticated loader to load the secure SPUlet 300. To provide an authenticated loader, a verification step 401A a host authentication 401B and a client authentication 401C may be performed.

In the verification step 401A a host PPE receives a request from client to run a secure SPUlet (which may be a secure extended-SPULET). The client passes verification parameters to host (e.g., secure format ID, version no., or other info identifying the decryption means need to decrypt encrypted code that the client wants to send to the host cell processor. Such information may include the number of SPUs needed to run the secure SPULET. The host uses this information to verify that it has the capability to handle the secure SPULET and notifies the client.

In the host authentication step 401B, the host processor then determines if the client can be trusted, e.g., by exchanging certificates.

In the client authentication step 401C, client determines that the host is trusted, e.g., by sending a certificate, e.g., encrypted code and/or data that needs to be authenticated through a secure SPE. The certificate has to be tied in some way to the encryption format for the secure SPULET, but could be in a different format than that used to decrypt the secure SPULET. The host receives the certificate, processes it with the secure SPE and generates some result that is sent back to the client. The client can check this result against an expected result for a trusted host.

Once the client is satisfied that the host can be trusted, the secure SPUlet 300 is transferred as a secure file image from the client device to the host device at step 402. The secure file image may contain a loader-encrypter-decoder code. Transfer of the file image between the host and client cell processors may take place across any network or bus, including but not limited to secure and unsecure networks, local area networks (LAN), wide area networks (WAN), or a public network such as the Internet. In some embodiments, the client machine may send the file header 310 to the host machine before sending the rest of the secure SPUlet. The host machine can analyze the information in the file header for acceptance criteria, e.g., whether the host machine or another device in which the SPUlet is directed, is known or determined to have sufficient SPUs, security clearance, rights, configuration, memory, etc. available to run the secure SPUlet. The host machine can then decide whether or not to accept the secure SPUlet or pass the secure SPUlet to another device or the target machine in which the SPUlet is directed.

Figure 5A:
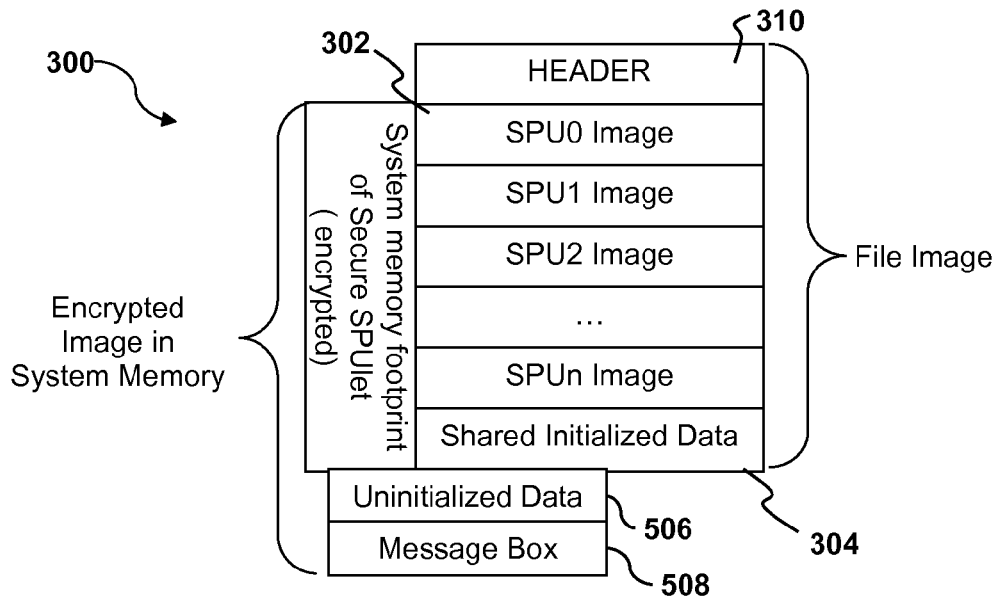
FIG. 5A is a block diagram illustrating memory allocation of an extended SPUlet during a stage of execution.
Figure 5B:
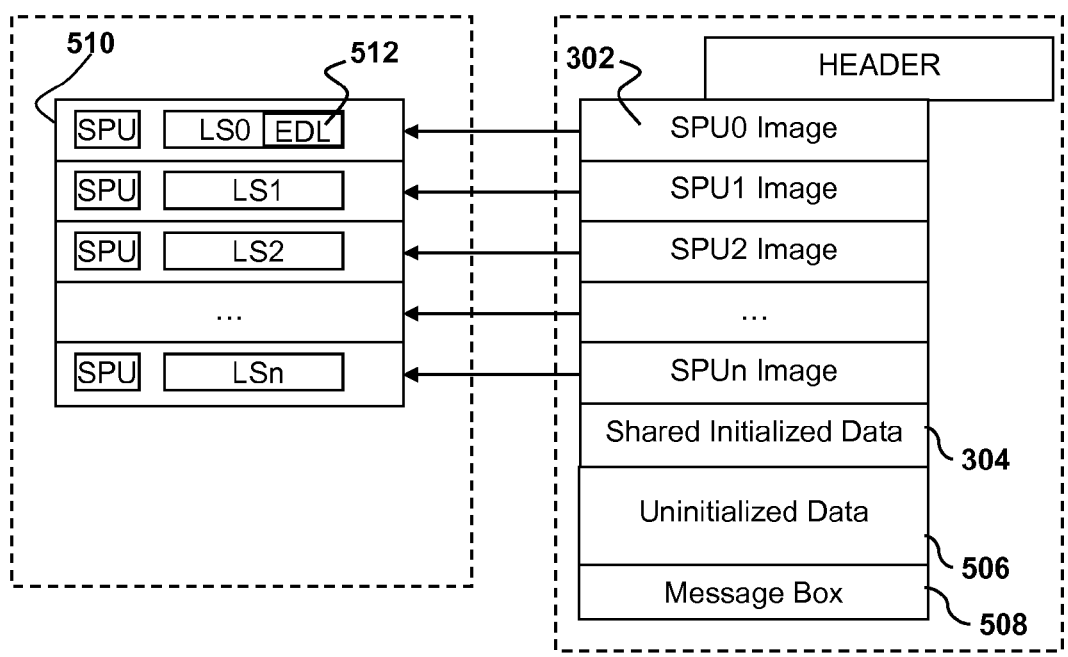
FIG. 5B is a block diagram illustrating memory allocation of an extended SPUlet during a different stage of execution.

If the host machine accepts the secure SPUlet, it allocates system memory for the extended SPUlet at step 404. The host machine may use the information in the file header to allocate the size and data type for a block of memory for the encrypted SPU images 302 and encrypted shared initialized data 304. Once the memory space has been allocated, the host processor can load the encrypted SPU images 302 and encrypted initialized data 304 of the secure SPUlet 300 into the main memory of the host cell processor at step 406. The host cell processor can then allocate an area for encrypted uninitialized data (if any) and a message box. It is preferred that memory is allocated in main memory of the PPU. However, specialized SPUlet application may configure memory in the PPU and/or in one or more SPU local stores, depending on specialized SPUlet applications. Generally, memory is allocated in main memory to satisfy the extended reach memory requirements for complex processing, such as video transcoding. FIGS. 5A-5B illustrate the organization of data for the extended SPUlet on the cell processor of the host device (the host cell processor). As shown in 5A, the host processor received the encrypted file image containing the encrypted SPU images 302, encrypted initialized data 304 and file header 310 (which may include encrypted information). Typically, only the encrypted SPU images 302 and encrypted initialized data 304 are stored in the host cell processor's main memory. These form the main memory footprint of the secure SPUlet 300. The data in the header 310 may be discarded once the host processor is finished with it.

At step 408, the host cell processor may allocate an area in its main memory for uninitialized data 506 and a message box 508. As shown in FIG. 5A the combination of SPU images 302, Initialized data 304 and the areas allocated for uninitialized data 506 and the message box 508 constitute the image in the host cell processors main memory for the extended SPUlet 300. At step 410, the host processor allocates SPEs 510 (as shown in FIG. 5B) for the extended SPUlet 300. At step 410, the host's SPE's are set up in secure mode as described above with respect to FIG. 2A. The secure SPEs are loaded with a trusted loader-encrypter-decrypter 512 that allows the secure SPE to load encrypted code and/or data through the window into the secure area, decrypt decode the code and/or data so that it can be run by the secure SPE and encrypt any information that is to be sent out of the secure SPE through the window.

Once the SPEs 510 are allocated and set up in secure mode, the encrypted SPU images 302 are loaded into the allocated SPEs 510 at step 412. The SPEs can then be run in secure mode at step 414 using the encrypter-decrypter-loader code 512.

The client need not be a cell. The client can be a personal computer (PC). The client only needs the encrypted file images and/or header that it sends to the cell processor. It is desirable to secure the cell processor from access by the user to prevent tampering of the host processor by the user. The SPE includes means for invoking a secure mode.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for securely operating a host device, the host device having a host processor unit and one or more additional processor elements, wherein each additional processor element includes an additional processing unit and a local memory exclusively associated with the additional processor, the method comprising:
    a) receiving a secure file from a client device at the host device, wherein the secure file includes encrypted contents;
    b) allocating one or more additional processor elements of the host device to the secure file;
    c) blocking off external access to the local memory of the one or more allocated additional processor elements except for a window portion through which data or code suitable for unsecure transmission may be transferred into or out of a particular allocated additional processor elements;
    d) loading trusted code into the window portion of the local memory of the one or more allocated additional processor elements;
    e) loading the encrypted contents into the local memory of the particular additional processor element allocated to the secure file, wherein the encrypted contents are loaded into the window portion of the particular allocated additional processor element;
    f) decrypting the encrypted contents using the trusted code; and
    g) executing code obtained by decrypting the encrypted contents with the particular allocated co-processor element or operating on data obtained by decrypting the encrypted contents with the particular allocated additional processor element.

2. The method of claim 1 wherein the trusted code includes decrypter-encrypter-loader code.

3. The method of claim 2 wherein the encrypter-loader-decoder code is configured to read in and/or write out only code and/or data that is suitable for non-secure transmission.

4. The method of claim 1 wherein the secure file further includes encrypted shared initialized data.

5. The method of claim 1 wherein the secure file includes encrypted code and/or data from the client processor.

6. The method of claim 1, further comprising allocating space in a main memory of the host device (host main memory) for the encrypted contents.

7. The method of claim 6, further comprising loading the encrypted contents into the allocated space in the host main memory.

8. The method of claim 1, further comprising allocating an area in a main memory of the host processor (host main memory) for uninitialized data and a message box.

9. The method of claim 1, further comprising loading data from the encrypted file into an additional processor element of the host processor.

10. The method of claim 1, further comprising, prior to receiving the secure file: verifying that the host processor can run the secure file.

11. The method of claim 1, further comprising receiving at the host device a request from the client device to run the secure file.

12. The method of claim 11, further comprising determining with the host processor whether to accept the secure file based on information received from the client device.

13. A non-transitory processor readable medium having embodied therein executable instructions that when executed implement a method for securely operating a host device having a host processor and one or more additional processor elements, wherein each additional processor element includes an additional processing unit and a local memory exclusively associated with the additional processor, the method comprising:
    a) allocating one or more of the processor additional processor elements to encrypted contents;
    b) blocking off external access to the local memory of the one or more allocated processor additional processor elements except for a window portion through which data or code suitable for unsecure transmission may be transferred into or out of a particular allocated co additional processor element;
    c) loading trusted code into the window portion of the local memory of the one or more allocated additional processor elements;
    d) loading the encrypted contents into the local memory of a particular allocated co-processor element, wherein the encrypted contents are loaded into the window portion of the particular allocated additional processor element;
    e) decrypting the encrypted contents using the trusted code; and
    f) executing code obtained by decrypting the encrypted contents with the particular allocated processor additional processor element or operating on data obtained by decrypting the encrypted contents with the particular allocated additional processor element.

14. The processor readable medium of claim 13, wherein the method further comprises receiving the encrypted contents at the host device.

15. The processor readable medium of claim 13 wherein the encrypted contents are embodied in the processor readable medium.

16. The processor readable medium of claim 13 wherein the encrypted contents includes encrypted data that has been processed by an additional processor element, data to be processed by the additional processor element, and/or code for processing the data with the additional processor element and/or encrypted data regarding a direct memory access (DMA) state and/or encrypted data regarding a hardware state of a additional processor element when a secure process was suspended.

17. A host device having a host processing unit and one or more additional processor elements, wherein each additional processor element includes an additional processing unit and a local memory exclusively associated with the additional processor, wherein the host processor and processor element are configured to:
   a) receive encrypted contents from a client device;
   b) allocate one or more co-processor elements to the encrypted contents;
   c) block off external access to the local memory of the one or more allocated additional processor elements except for a window portion through which data or code suitable for unsecure transmission may be transferred into or out of a particular allocated additional processor element of the host device;
   d) load trusted code into the window portion of the local memory of the one or more allocated additional processor elements;
   e) load the encrypted contents into the local memory of the particular allocated co-processor element, wherein the encrypted contents are loaded into the window portion of the particular additional processor element;
   f) decrypt the encrypted contents using the trusted code; and
   g) execute code obtained by decrypting the encrypted contents with the particular allocated additional processor element or operate on data obtained by decrypting the encrypted contents with the particular allocated co-processor element.

18. The host device of claim 17 wherein at least one of the additional processor elements is a secure element set up to operate in a secure mode.

19. The host device of claim 18 wherein a local memory of the secure element includes a secure portion that is not accessible by the host processor, other additional processor elements or other processors of the host device except for a window through which encrypted code and/or data may be transferred into and out of secure portion.

20. The host device of claim 19 wherein the local memory of the secure element further includes a trusted code.

21. The host device of claim 20 wherein the trusted code is encrypted, authenticated, or signed.

22. The host device of claim 17, wherein the encrypted contents includes encrypted data that has been processed by a additional processor element, data to be processed by the additional processor element and/or code for processing the data with the additional processor element and/or encrypted data regarding a direct memory access (DMA) state and/or encrypted data regarding a hardware state of a co-processor element when a secure process was suspended.

* * * * *